US008819844B2

(12) United States Patent
Balasubramaniam et al.

(10) Patent No.: US 8,819,844 B2
(45) Date of Patent: Aug. 26, 2014

(54) METHOD AND SYSTEM FOR DATA IMPLANT IN SET UP MESSAGE

(75) Inventors: Saraswathi Balasubramaniam, Palo Alto, CA (US); Syed Zaeem Hosain, San Jose, CA (US)

(73) Assignee: Aeris Communications, Inc., Santa Clara, CA (US)

( * ) Notice: Subject to any disclaimer, the term of this patent is extended or adjusted under 35 U.S.C. 154(b) by 100 days.

(21) Appl. No.: 13/436,214

(22) Filed: Mar. 30, 2012

(65) Prior Publication Data

US 2013/0263236 A1 Oct. 3, 2013

(51) Int. Cl.
*H04L 29/06* (2006.01)
(52) U.S. Cl.
USPC .................................. 726/27; 726/7; 726/26
(58) Field of Classification Search
USPC .......................................................... 726/27
See application file for complete search history.

(56) References Cited

U.S. PATENT DOCUMENTS

| 6,219,790 | B1 * | 4/2001 | Lloyd et al. ...................... 726/14 |
| 7,546,276 | B2 * | 6/2009 | Randle et al. ..................... 705/65 |
| 8,479,001 | B2 * | 7/2013 | Yoneda et al. ................. 713/175 |
| 2005/0109835 | A1 * | 5/2005 | Jacoby et al. .................. 235/379 |
| 2008/0168370 | A1 * | 7/2008 | Maher et al. ................... 715/764 |
| 2009/0200789 | A1 * | 8/2009 | Redmond et al. ................ 283/67 |
| 2011/0280180 | A1 * | 11/2011 | McCann et al. .............. 370/328 |

OTHER PUBLICATIONS

Asokan et al., AAA for IPv6 Network Access, IPng Working Group, Jan. 2000.*
Sebastian et al,. "Identity management and its support of multilateral security", Computer Networks 37, 2001, pp. 205-219.*

* cited by examiner

*Primary Examiner* — Mohammad L Rahman
(74) *Attorney, Agent, or Firm* — Sawyer Law Group, P.C.

(57) ABSTRACT

A delivery of application data within a predetermined attribute type of protocol message across a communication network is disclosed. The non-specific application data is deployed within one or more attribute types for extraction and use by a protocol's server after establishing authentication of the user device. In one or more preferred implementations, the protocol reflects the principles of an Authentication, Authorization and Accounting (AAA) framework type.

23 Claims, 9 Drawing Sheets

METHOD AND SYSTEM FOR DATA IMPLANT IN SET UP MESSAGE

FIELD OF THE INVENTION

The present invention relates generally to network and data communications and more particularly to a method and apparatus for rapidly delivering implanted application content within framework messages over a communications network.

BACKGROUND OF THE INVENTION

Often it is desirable for remote devices, such as wireless phones and other wireless devices ("remote devices") to initiate or be initiated to effect an active data session with a central station, server or other uplink means. Ensuring the rapid transmission and receipt of data across a communications network, similarly, is also desirable. In these environments, however, establishing a rapid and secure path through the use of a secure protocol for providing for the secure transmission and receipt of such information is also highly desired.

It is generally known that Authentication, Authorization, and Accounting (AAA) frameworks are used in computer and cellular networks. The AAA framework is generally utilized to perform three functions: 1) to authenticate users or devices; 2) to authorize the use of resources by users or devices; and 3) to generate and store accounting information of how the users or the devices utilize the resources. Examples of two protocols that utilize the AAA framework are Remote Authentication Dial-In User Service (RADIUS) and Diameter. Details of the Radius protocol may be generally referenced at RFC 2865 (such as at http://www.ietf.org/rfc/rfc2865.txt) and details of the Diameter protocol may be generally referenced at RFC 3588 (such as at http://tools.ietf.org/html/rfc3588) each of which is incorporated herein by reference.

In a AAA framework, such as one that utilizes RADIUS or Diameter, the clients and servers (i.e., users/devices and servers) are required to be identified as between one another often by their network addresses. Once identified by one another, communications as between the client and server may be initiated based on the network addresses. Those communications become secure when communication over the protocol, as between the client(s) and server(s), is preferred through the use of shared secrets that may include a variety of forms (i.e., encrypting user names and passwords, challenge-response authentication, and/or public/private key encryption of protocol messages, for instance but not by way of limitation). Devices are identified by unique device identifiers, such as International Mobile Subscriber Identity (IMSI), Mobile Equipment Identifier (MEID), Mobile Directory Number (MDN), Mobile Station ISDN (MSISDN), and the like.

Figure 1:
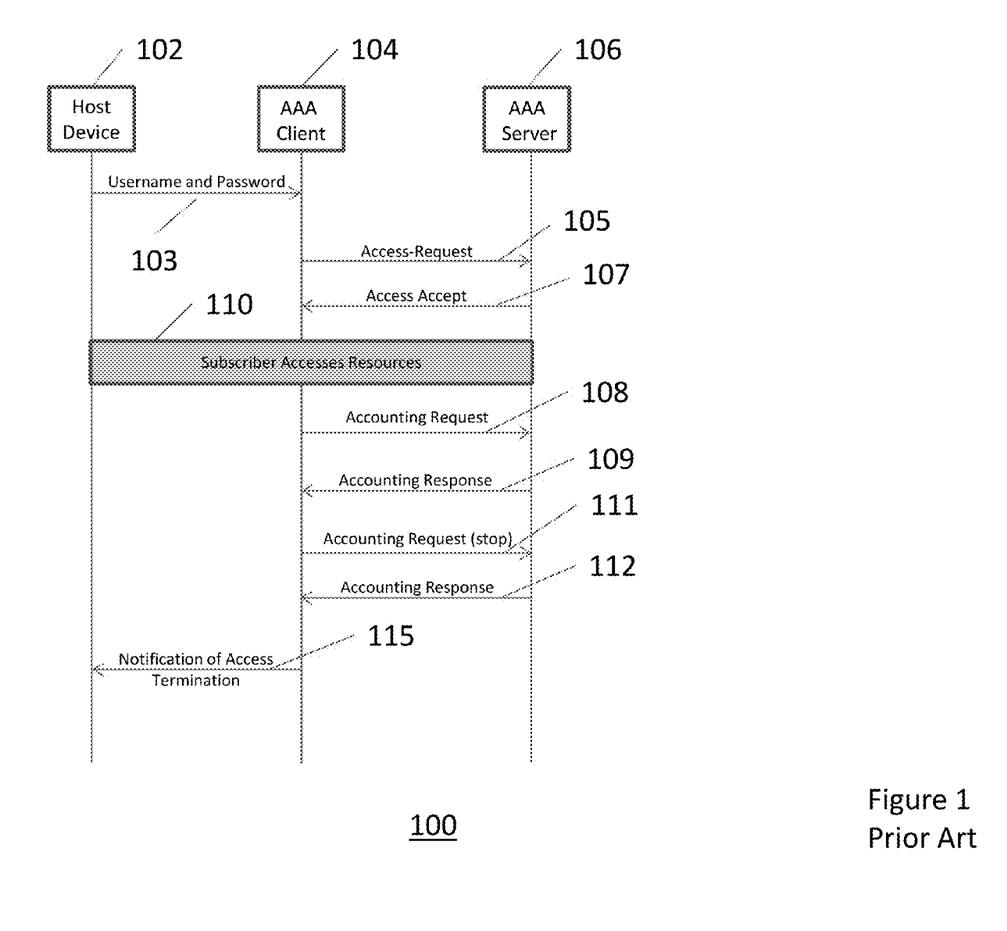
FIG. 1 sets forth an example of the establishment of an AAA communication connection.

Within the AAA framework it is widely understood that the authentication, authorization and accounting information is typically exchanged as between AAA clients and AAA servers through messages transported over wired or wireless networks. Other servers also use the RADIUS and Diameter protocols for a subset of the AAA framework messages. For example, the Home Subscriber Server (HSS) uses the Diameter protocol to authenticate devices in 4G wireless cellular networks and incorporates a subset of the AAA functionality that is also covered by this invention, and the HSS is thus a AAA server for this purpose. The AAA servers are responsible for receiving user or device connection requests, authenticating the user or the device, and then returning appropriate information necessary for the client to deliver service to the user or the device. In operation, the RADIUS and Diameter protocols authorization provides that users are authorized by definition only after they pass an authentication approval from the RADIUS and Diameter server. FIG. 1 sets forth an example of the establishment of an AAA communication connection.

In FIG. 1, a host device 102 is set forth which passes a username and password 103 to the AAA client 104. Once received at the AAA Client 104, an Access-Request is transmitted at 105 to the AAA Server 106. The AAA Server 106 verifies the credentials and passes an Access Accept response at 107 to the AAA Client 104. With these responses, the Host Device 102 is able to have subscriber access of resources in a secure environment across the communications link at 110. An Accounting Request Start is transmitted at 108 to the AAA Server 106. The AAA Server 106 returns an Accounting Response at 109 to the AAA Client 104. Once the AAA Client 104 provides a stop accounting requests at 111 to the AAA Server 106, the AAA Server 106 returns an Accounting Response to stop 112 to the AAA Client 104 and the Access Termination notification is provided at 115 to the Host Device 102, terminating the communication link.

Figure 2:
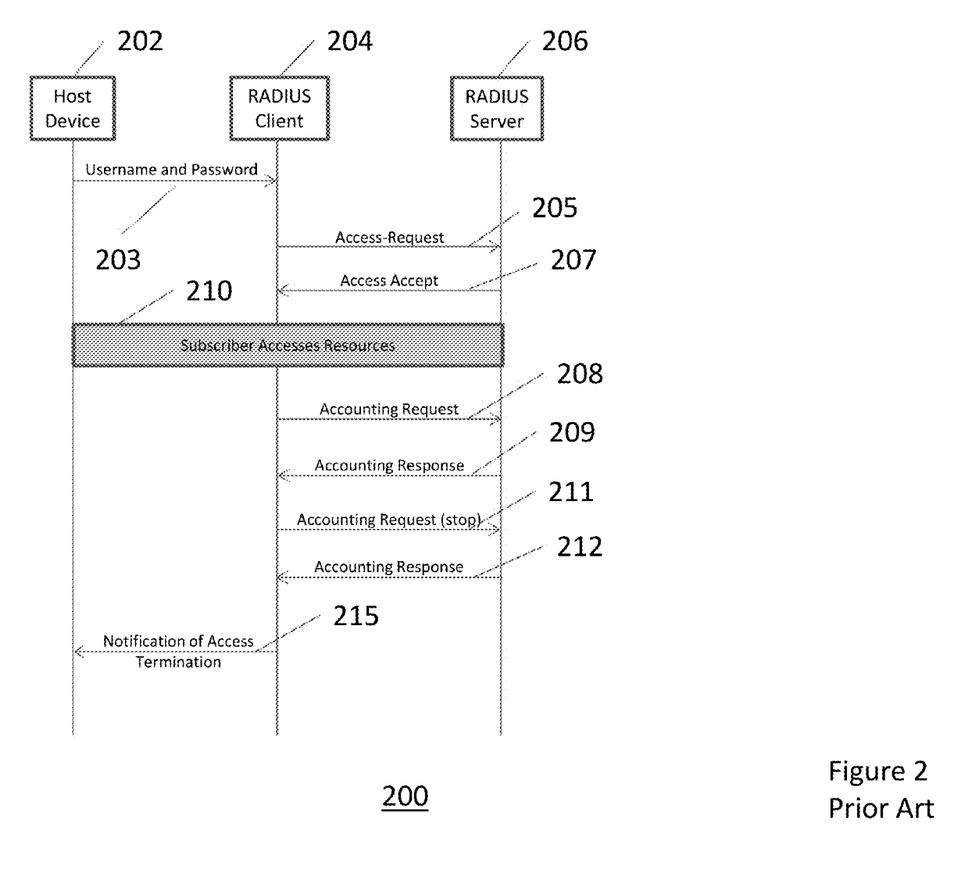
FIG. 2 sets forth an example of the establishment of a secure communication connection over a RADIUS protocol.

In FIG. 1, the user authentication process of a RADIUS server often involves a device that can provide a proxy function, as well. The information that is shared as between the RADIUS client and the RADIUS Server is authenticated through a shared key for security. The RADIUS protocol combines the authentication and authorization processes by sending authorization information in the authentication response message. FIG. 2 sets forth an example of the establishment of a secure communication connection over a RADIUS protocol.

In FIG. 2 a username and password 203 are entered from the user device 202 for receipt at the RADIUS Client 204. Once received at the RADIUS Client 204, an authentication request via an Access-Request is transmitted at 205 to the RADIUS Server 206. The RADIUS Server 206 compares the received user information with that in the Users database (not pictured) and then verifies the authenticity of the received data, thereafter, if favorable, passing an authentication successful message via an Access Accept response containing the information of the user's right at 207 to the RADIUS Client 204. The RADIUS client 204 similarly accepts or rejects the user according to the returned authentication result. With an Access-Accept 207, the user (i.e., subscriber) 202 is able to access the network resources as the availability of subscriber access in a secure environment across the communications link at 210. An Accounting Request (i.e. start as the value of the Status Type is "start") is transmitted at 208 to the RADIUS Server 206. The RADIUS Server 206 returns an Accounting Response (i.e., start accounting) at 209 to the RADIUS Client 204. Once the RADIUS Client 204 provides a stop accounting requests (i.e., Status Type is "stop") at 211 to the RADIUS Server 206, the RADIUS Server 206 returns an Accounting Response to stop 212 to the RADIUS Client 204 and the Access Termination notification is provided at 215 to the user 202, terminating the ability for the user to access the network resource.

The AAA framework provides an effective and reliable communication link when the client and server are secured, however, the AAA framework is thought to be generally limited only to that specific information and configuration data associated with the RADIUS and Diameter protocols. For instance, information that is transmitted within the AAA framework is well-defined by the fields that are defined by the various RADIUS and Diameter protocols. By way of further example, it is known that for the RADIUS protocol, the attribute fields are defined as below in Table 1.

TABLE 1

Table 2 RADIUS attributes

| Type | Attribute type |
|---|---|
| 1 | User-Name |
| 2 | User-Password |
| 3 | CHAP-Password |
| 4 | NAS-IP-Address |
| 5 | NAS-Port |
| 6 | Service-Type |
| 7 | Framed-Protocol |
| 8 | Framed-IP-Address |
| 9 | Framed-IP-Netmask |
| 10 | Framed-Routing |
| 11 | Filter-ID |
| 12 | Framed-MTU |
| 13 | Framed-Compression |
| 14 | Login-IP-Host |
| 15 | Login-Service |
| 16 | Login-TCP-Port |
| 17 | (unassigned) |
| 18 | Reply_Message |
| 19 | Callback-Number |
| 20 | Callback-ID |
| 21 | (unassigned) |
| 22 | Framed-Route |
| 23 | Framed-IPX-Network |
| 24 | State |
| 25 | Class |
| 26 | Vendor-Specific |
| 27 | Session-Timeout |
| 28 | Idle-Timeout |
| 29 | Termination-Action |
| 30 | Called-Station-Id |
| 31 | Calling-Station-Id |
| 32 | NAS-Identifier |
| 33 | Proxy-State |
| 34 | Login-LAT-Service |
| 35 | Login-LAT-Node |
| 36 | Login-LAT-Group |
| 37 | Framed-AppleTalk-Link |
| 38 | Framed-AppleTalk-Network |
| 39 | Framed-AppleTalk-Zone |
| 40-59 | (reserved for accounting) |
| 60 | CHAP-Challenge |
| 61 | NAS-Port-Type |
| 62 | Port-Limit |
| 63 | Login-LAT-Port |

From Table 1, the Attribute Type carries information about the details of a request or response, by design and in accordance with the RADIUS protocol design. The Attribute Field is represented in triplets of Type, Length and Value. Similarly, an extension attribute (i.e., Attribute 26) is available to define extended attributes to implement functions that the standard RADIUS protocol does not provide.

For Type, there is one byte, in the range 1 to 255 and is used for indicating the type of the attribute. For instance, commonly used attributes for RADIUS authentication and authorization are listed in Table 1. For Length, there is one byte for indicating the length of the attribute in bytes, including the Type, Length, and Value fields. For Value, there is the value of the attribute, up to 253 bytes, typically, where the format and content depend on the Type and Length fields. While these byte lengths are prescriptive from the protocol, the actual values may vary to be less than the prescriptive values in actual operation.

As the AAA framework (inclusive of RADIUS and Diameter) provides for the ability to securely, effectively and reliably communicate across wired and wireless communication links using information in Attribute Types under the protocol, it is generally acknowledged that such communication is strictly limited only to that specific type of information and configuration data associated with the protocol and the associated Attribute Types. For instance, information that is transmitted within the RADIUS and Diameter protocols are well-defined by the designated attribute field for that information. By example, in the RADIUS protocol, a username is intended to be that content for the username, even though the attribute type for username is a Type 1 and has a Length value longer than the typical username. It is however desirous to develop a solution to benefit from the additional unused capability of the attribute types of a protocol such as RADIUS, in a communication network, thereby providing for secure, authenticated and authorized communication as between the user and the server, such that non-traditional, non-specific application data may be utilized with the Attribute Type(s) as a message including special data not otherwise originally expected or intended under the specific protocol. Preferably, it would be desired to have such a solution where the protocol reflects the principles of an authentication, authorization and accounting protocol type.

As used herein the terms device, apparatus, user, system, etc. are intended to be inclusive, interchangeable, and/or synonymous with one another and other similar arrangements and equipment for purposes of the present invention though one will recognize that functionally each may have unique characteristics, functions and/or operations which may be specific to its individual capabilities and/or deployment.

SUMMARY OF THE INVENTION

The present invention fulfills these needs and has been developed in response to the present state of the art, and in particular, in response to the problems and needs in the art that have not yet been fully solved by currently available technologies.

One embodiment of the present invention provides for a method for delivering data within a predetermined attribute type of a protocol message across a communication network, the method comprising the computer-implemented steps of: at a user in communication with a client that is capable of authenticating itself in a communications network with a server, implanting application data within a predetermined attribute type; authenticating the predetermined attribute type by the client in communication with the server by verifying the user through a lookup database by the server in association with the predetermined attribute type; and extracting the implanted application data from the predetermined attribute field at the server; and passing the extracted implanted application data to a server.

Another embodiment of the present invention provides for a computer program product stored on a computer usable medium, comprising: computer readable program means for causing a computer to deliver implanted application data within a predetermined attribute type of an Authentication, Authorization and Accounting (AAA) framework message across a communication network, comprising the steps of: at a user in communication with a AAA client that is capable of authenticating itself in a communications network with a AAA server, transmitting implanted application data within a predetermined attribute type along with information data of the predetermined attribute type in a message from the user to the AAA client; extracting the implanted data from the message for receipt by the AAA server using logic at the AAA server; authenticating the predetermined attribute type by the AAA client in communication with the AAA server by verifying the user through a lookup database by the AAA server in association with the predetermined attribute type; and passing the extracted implanted application data to a server.

A further preferred embodiment of the present invention provides for an apparatus operable to include implanted application data within one or more predetermined attribute types of an authentication, authorization and accounting (AAA) framework message for communication across a communication network, one or more processors; and one or more stored sequences of instructions which, when executed by the one or more processors, are operable at least to: at a user in communication with a AAA client that is capable of authenticating itself in a communications network with a AAA server, implant application data within a predetermined attribute type; transmit the predetermined attribute type for receipt from the user to the AAA client; authenticate the predetermined attribute type by the AAA client in communication with the AAA server by verifying the user through a lookup database by the AAA server in association with the predetermined attribute type; extract the implanted application data from the predetermined attribute field at the AAA server; and pass the extracted implanted application data to a server.

In one or more preferred embodiments, the protocol is preferably that of an AAA framework, which is further preferably of one of i) a Remote Authentication Dial-In User Service (RADIUS) protocol and ii) a Diameter protocol.

The present invention provides for a solution benefiting from the additional unused capability of the Attribute Types of the RADIUS or Diameter protocols in a communication network, by providing implanted non-traditional, non-specific application data, of special data not otherwise originally expected or intended, within one or more attribute types within a message for transmission and receipt under the AAA framework.

Further embodiments, forms, objects, features, advantages, aspects, and benefits of the present application shall become apparent from the detailed description and drawings included herein.

DETAILED DESCRIPTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention disclosed provides for delivery of non-traditional implanted application data within a predetermined attribute type of an Authentication, Authorization and Accounting (AAA) framework message across a communication network. The non-specific application data is deployed within one or more attribute types for extraction and use by an AAA server after establishing authentication of the user device.

Figure 3:
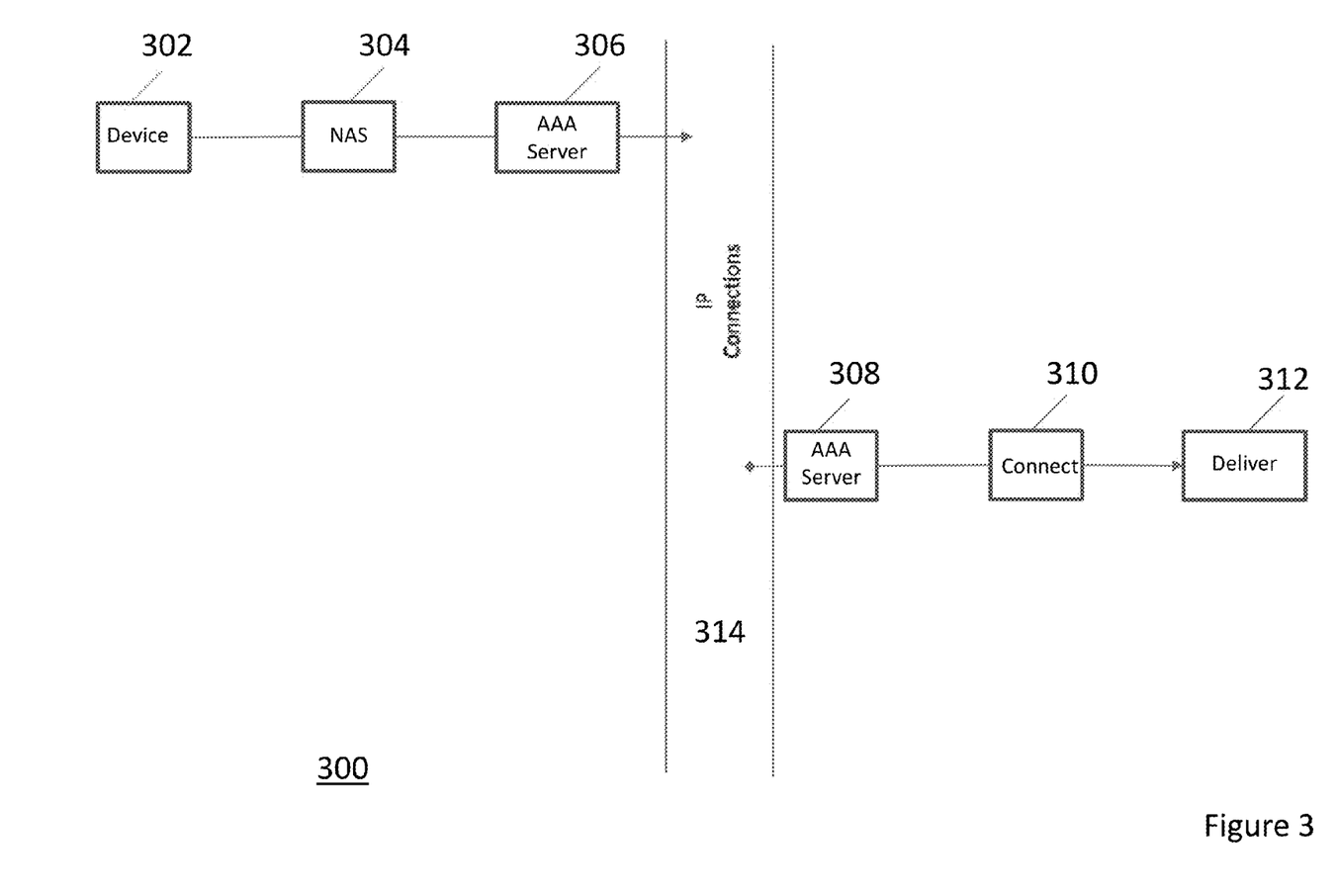
FIG. 3 illustrates a preferred embodiment of the present invention depicting a communications network under the AAA framework.

FIG. 3 illustrates a preferred embodiment of the present invention depicting a communications network 300 under the AAA framework.

From FIG. 3, a host device (i.e., user) 302 in communication with a Network Access Server (NAS) 304 is in further communication with an AAA Server 306. A further AAA Server 308 is in communication with a customer server 312 through a connection link 310. The connection link may include a connection linkage to a different communications network or other device in one or more preferred embodiments. Providing for communication as between the two AAA Servers 306, 308 is Internet Protocol (IP) Connections (also referred to as a Wide Area Network (WAN)) at 314 using AAA framework. In one or more preferred embodiments, the AAA framework may utilize a RADIUS protocol or a Diameter protocol.

Figure 4A:
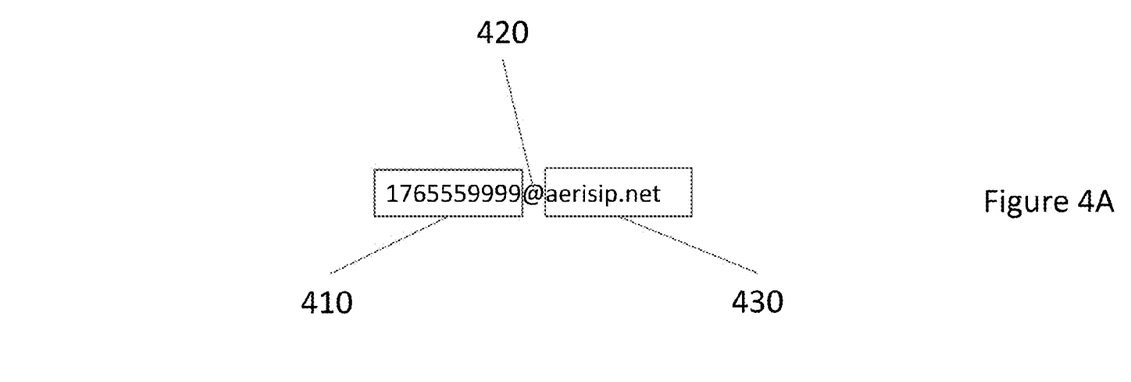
FIG. 4A depicts a traditional username in accordance with the RADIUS protocol.
Figure 4B:
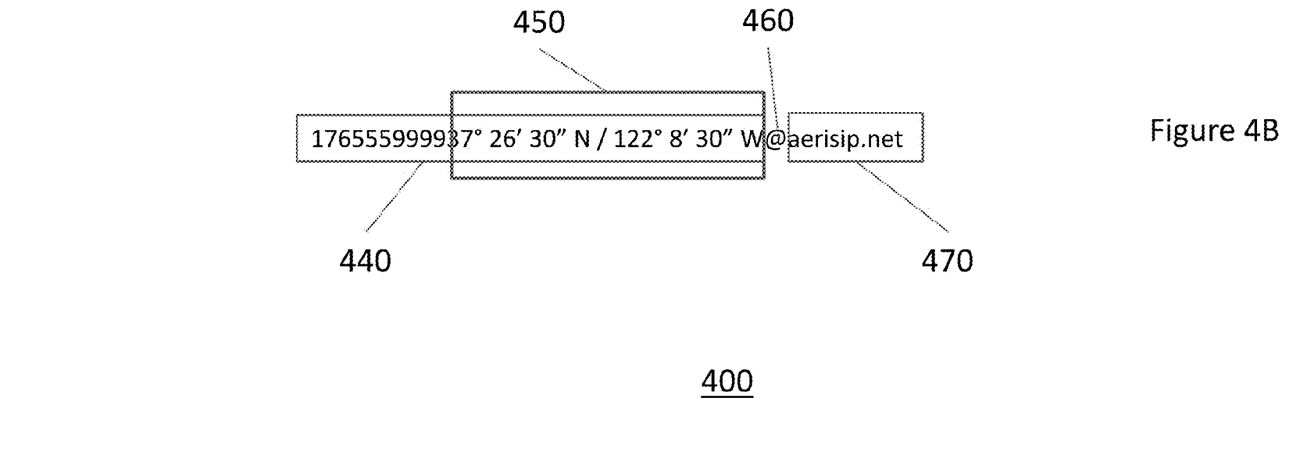
FIG. 4B depicts a username compliant with the RADIUS protocol and inclusive of implanted application data in accordance with the present invention.

Operatively, in one or more preferred embodiments, the present invention provides for the host device (i.e., user) 302 sending one or more an attribute types through the NAS 304 to the AAA Server 306. Within the attribute type is information associated with the attribute type (such as user name for username) as well as non-specific data not associated with the attribute type associated with application data. The additional and non-traditional application data included within the message in the attribute field may be located within the associated field in byte locations that are unused but permitted under the protocol. FIGS. 4A and 4B further clarify such detail by way of example.

The attribute type is sent from the AAA Server 306 across the IP connection 314 via the RADIUS protocol where after it is received by the AAA Server 308 which is also an AAA Server associated with the same protocol of the AAA Server 306. At AAA Server 308 the additional, non-traditional application data (also used herein as "special data," "implanted application data," etc.) is extracted from the information of the attribute type. For example and not by way of limitation, the attribute type may any one of the attribute fields set forth in Table 1 above.

The extracted application data is then preferably routed and communicated to a server associated with the device that transmitted the implanted application data. In one or more preferred embodiments, the implanted application data may include data that causes a device or activity to occur in response to receipt of such application data. For instance, the non-specific data may include information associated with an alarm such that the receiving device, when routed from the receiving AAA Server, is able to initiate a further application activity, such as monitoring by video, for instance, the location of where the alarm has occurred. It will be understood by those of ordinary skill in the art that the initiation of a follow-up application in response to the received application data is both contemplated by the present invention and capable of operation within one or more of the preferred embodiments.

FIG. 4A depicts a traditional username in accordance with the RADIUS protocol, whereas FIG. 4B depicts a username compliant with the RADIUS protocol and inclusive of implanted application data in accordance with the present invention.

From FIG. 4A, a username having multiple digits is identified at 410. The username by way of example may be a mobile directory number for instance as in the FIG. 4A, where the number is 1765559999. The username digits of 410 are separated by a partition symbol at 420. The data in the area of 430 denotes the realm the device belongs to. The data partition symbol may be one of an alphabetic character, a numeric, and a non-alphanumeric character such as custom or specialized type character that is recognizable by machine-readable program instructions.

From FIG. 4B, a username having multiple digits is identified at 440. The username by way of example may be a mobile directory number for instance as in the FIG. 4B, where the number is 1765559999 at 440. The username digits of 440 include additional non-specific application data including in this case latitude and longitude information at 450. The username information, having both traditional mobile directory number information and additionally implanted application data of 450 are separated from the realm data 470 by a symbol at 460. The data in the area of 430 denotes the realm the device belongs to. The implanted application data may be readily extracted by a AAA Server using the present invention such that the extracted implanted application data may then be transmitted, sorted, or otherwise utilized for further processing by the extracting AAA server.

Although a username attribute type has been highlighted under FIG. 4B, the present invention is not so limited and may utilize any of the attribute types, even in combination, as set forth in Table 1.

Figure 5:
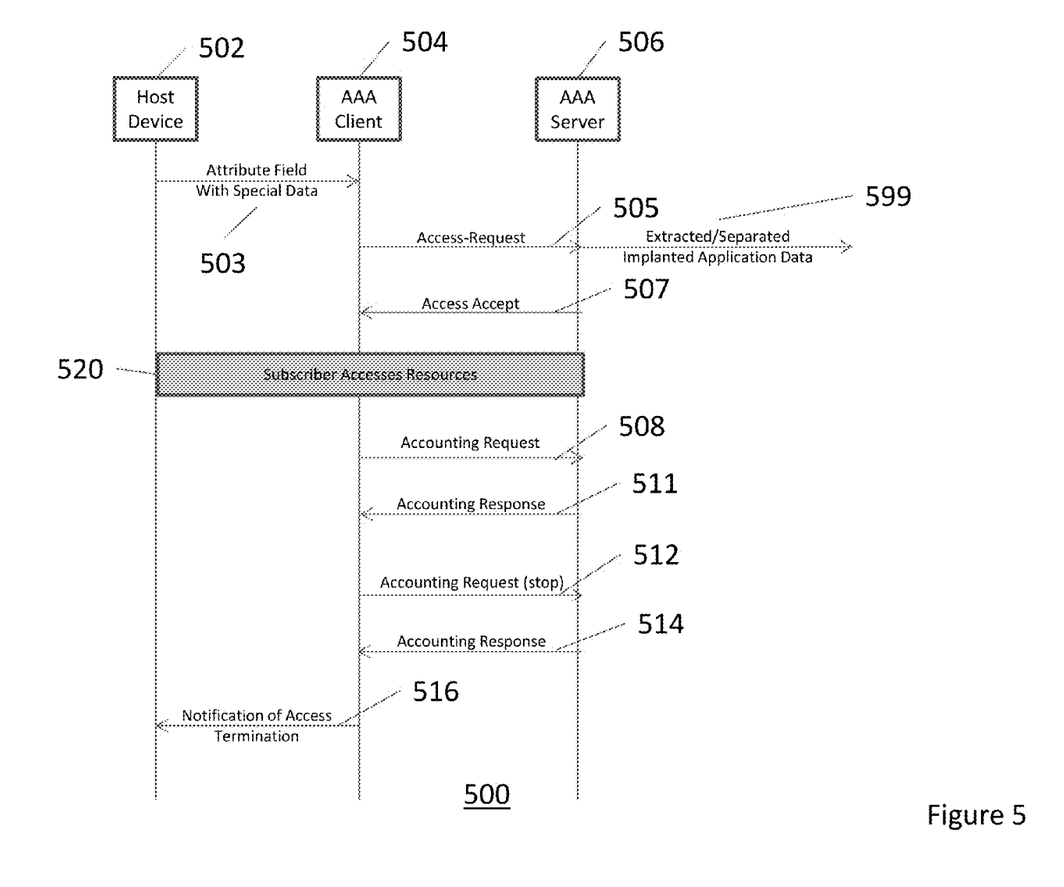
FIG. 5 depicts an example of the establishment of a secure communication connection over an AAA framework using the present invention in accordance with one embodiment.

FIG. 5 depicts an example of the establishment of a secure communication connection over an AAA framework 500 using the present invention in accordance with one embodiment. From FIG. 5, data of that anticipated for a predetermined attribute type in combination with data of a non-specific application data not anticipated for the attribute type 503 is entered from the user device 502 for receipt at the AAA Client 504. Once received at the AAA Client 504, an authentication request, inclusive of both the normal attribute type field data and the non-specific application data, via an Access-Request transmission at 505 to the AAA Server 506. The AAA Server 506 compares the received user information of the transmission with that in the Users database (not pictured) and then verifies the authenticity of the received data. The AAA Server 506 also identifies the additional non-specific application data (i.e., implanted application data) and parses the application data from the transmission at 599.

The AAA Server 506 identifies the additional non-specific application data (i.e., implanted application data) and parses the application data from the transmission at 599 at a predetermined period, in one or more preferred embodiments. The server's extraction of the implanted application data occurs at a predetermined period that being part of the pre-coordination as between the client and server under the protocol. Preferably, the predetermined period is a period of time associated with the receipt of the implanted application data as reference, where such time is preferably one of i) upon and concurrent with receipt of the implanted data (i.e., set-up), after receipt but before verifying the user (i.e., pre-authentication), after verifying the user but before providing a user access to resources across the communications network (i.e., pre-access), and after providing the user access to the communications network under the AAA framework (i.e., post-access). It will be appreciated by those skilled in the art that the above-listed predetermined periods may further vary in time and across the period of various processing steps occurring under the associated protocol.

In the case of the attribute type being a username, for example, containing a user name and alarm information, the alarm information is non-specific to the attribute type and is implanted application data intended for use elsewhere once identified and extracted by the AAA server whereas the user name is data anticipated as expected within the context of the attribute type, username.

The AAA server 506 having determined the association of the non-specific application data information with an intended user or other activity event such as storage or similar, further the extracted application data as intended. Such processing under the present invention, as will be appreciated by one skilled in the art, includes further the provision of the extracted data for its intended use as may be directed from the Users database, activity on the extracted data as may be directed from another source, provision of the data to a further user for additional activity or application instantiation, or similar, etc.

In a further preferred embodiment, having performed the functions associated with the Access-Request message of mixed data and authenticating the user from the Users database association, the AAA Server 506 passes an authentication successful message via an Access Accept response containing the information of the user's right at 507 to the AAA Client 504. The AAA client 504 similarly accepts or rejects the user according to the returned authentication result, where, if accepted the user (i.e., subscriber) 502 is able to access the network resources as the availability of subscriber access in a secure environment across the communications link at 520. An Accounting Request (i.e. start as the value of the Status Type is "start") is transmitted at 508 to the AAA Server 506. The AAA Service 506 returns an Accounting Response (i.e., start accounting) at 511 to the AAA Client 504. Once the AAA Client 504 provides a stop accounting requests (i.e., Status Type is "stop") at 512 to the AAA Server 506, the AAA Server 506 returns an Accounting Response to stop 514 to the AAA Client 504 and the Access Termination notification is provided at 516 to the user 502, terminating the ability for the user to access the network resource.

Figure 6:
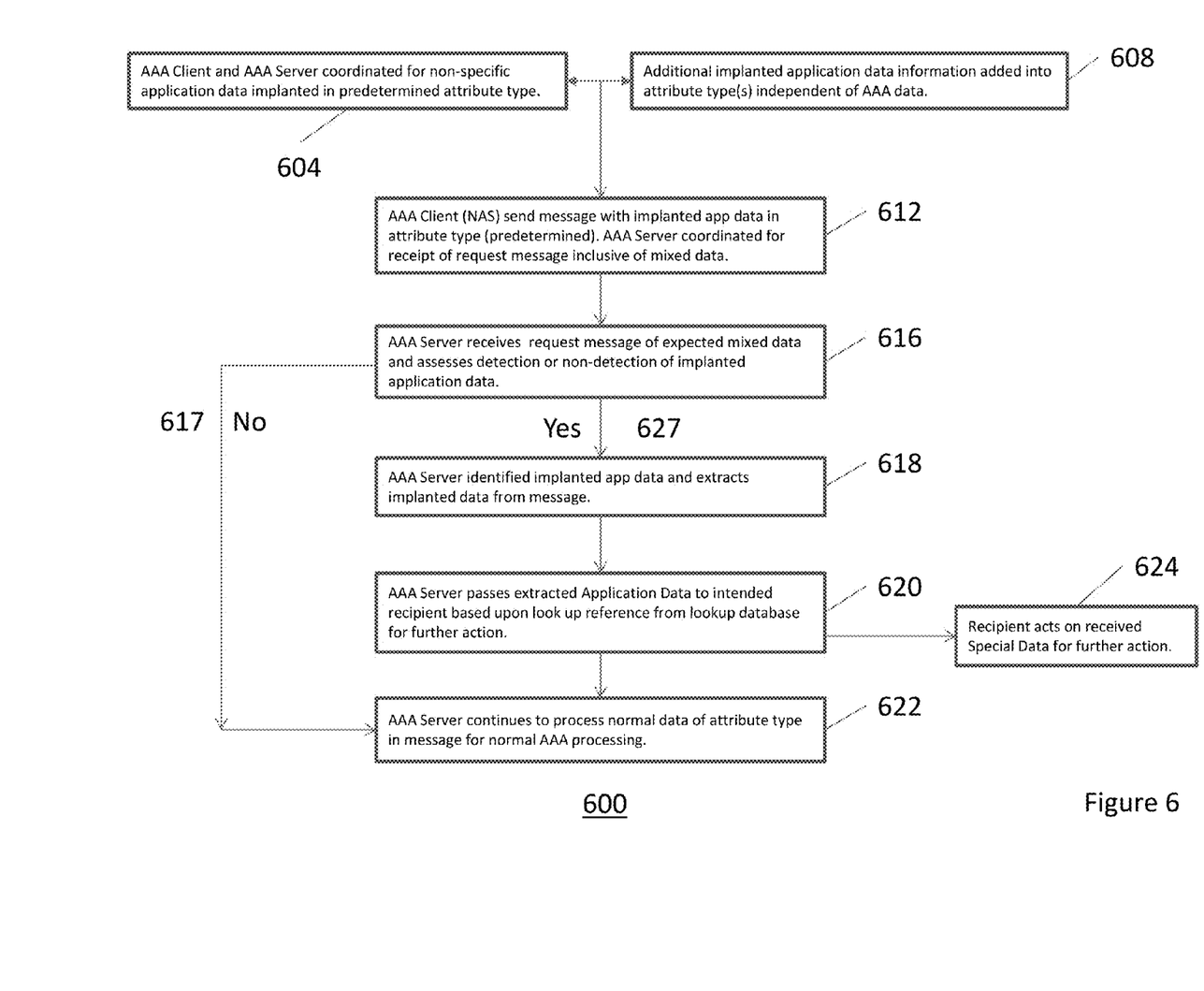
FIG. 6 illustrates a method of the present invention in which implanted application data is passed for extraction by an AAA server in accordance with one or more preferred embodiments.

FIG. 6 illustrates a method of the present invention in which implanted application data is passed for extraction by an AAA server in accordance with one or more preferred embodiments. From FIG. 6, an AAA Client and AAA Server are pre-coordinated to be receptive to the use and inclusion of non-specific application data within one or more predetermined attribute types from a user at 604. Similarly, the non-specific application data is added to the predetermined attribute type of the user independent of AAA at 608. The attribute type is entered from the user device inclusive of both attribute field data and non-specific application data (i.e., implanted application data) for receipt, at the AAA Client. An authentication request is then transmitted at 612, inclusive of both the normal attribute type field data and the non-specific application data, via an Access-Request transmission to the AAA Server. The AAA Server expects to receive a mixed data transmission due to the pre-coordination event.

The AAA Server determines if the non-specific data that had been expected is present or is absent at 616 and compares the data received versus that expected. In the event the expected implanted application data is not present, at 617, the AAA Server would continue to process the received data in accordance with the AAA process previously described and at 622. In the event the expected implanted application data is present, at 627, the AAA Server identifies the implanted application data and extracts the implanted application in accordance with the directions from the Users database or similar instruction at 618. Once extracted, the AAA Server then passes the extracted implanted application data to the intended recipient at 620 where the passed data is further acted upon, preferably, at 624. Following such activity or concurrently therewith, the AAA Server would continue to process the received data in accordance with the AAA process previously described at 622.

Figure 7:
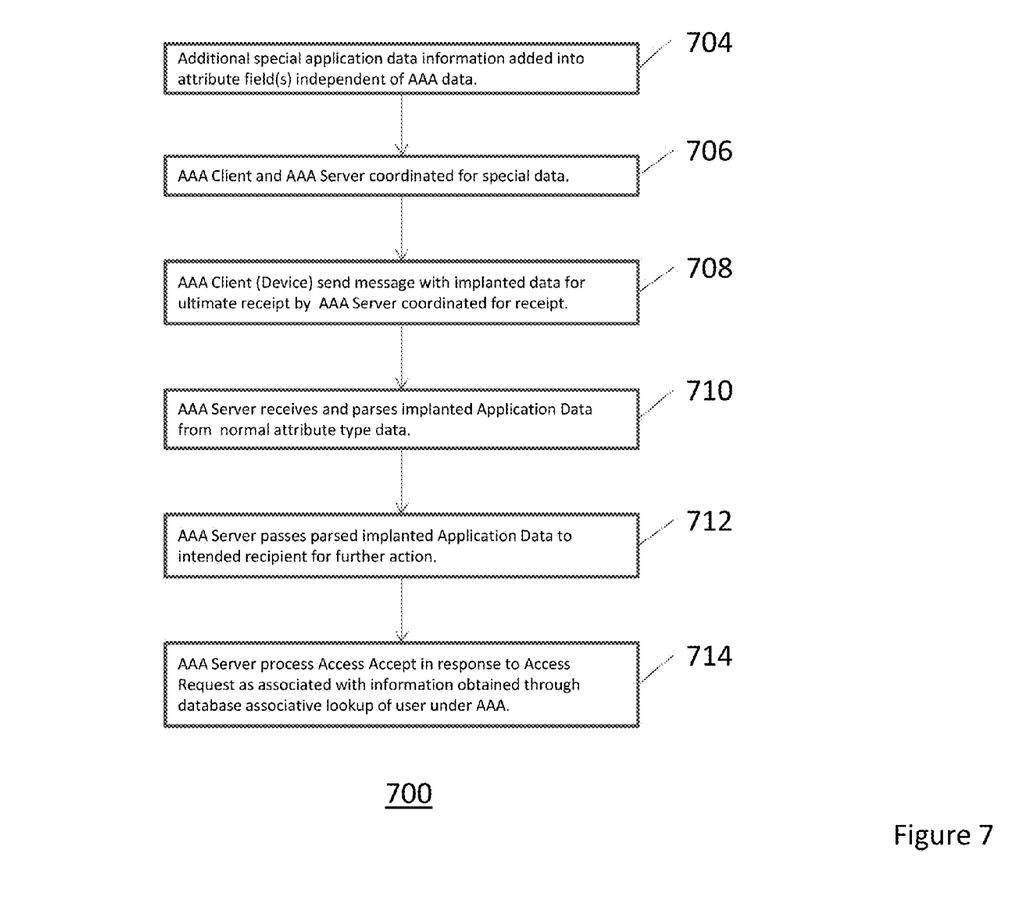
FIG. 7 illustrates a method of the present invention in which implanted application data is passed for parsing by an AAA server and continued processing under the AAA framework in accordance with one or more preferred embodiments.

FIG. 7 illustrates a method of the present invention in which implanted application data is passed for parsing by an AAA server and continued processing under the AAA framework in accordance with one or more preferred embodiments. From FIG. 7, the non-specific application data is added to a field of an attribute type in addition to the normal information associated with that attribute type and expected data to be received at 704. The AAA Client and AAA Server are pre-coordinated for communication by either RADIUS or Diameter protocols in which the client and server expect to process non-specific data (i.e., special data) in accordance with a predetermined attribute type at 706. At 708 the non-specific application data is implanted in the attribute type and is received through messaging associated with the AAA framework to an AAA Server. The received implanted non-specific application data is parsed and extracted at 710. The extracted data is then sent to the intended recipient at 712. The AAA Server continues processing the expected specific data of the attribute type in accordance with the protocol processing at 714.

Figure 8:
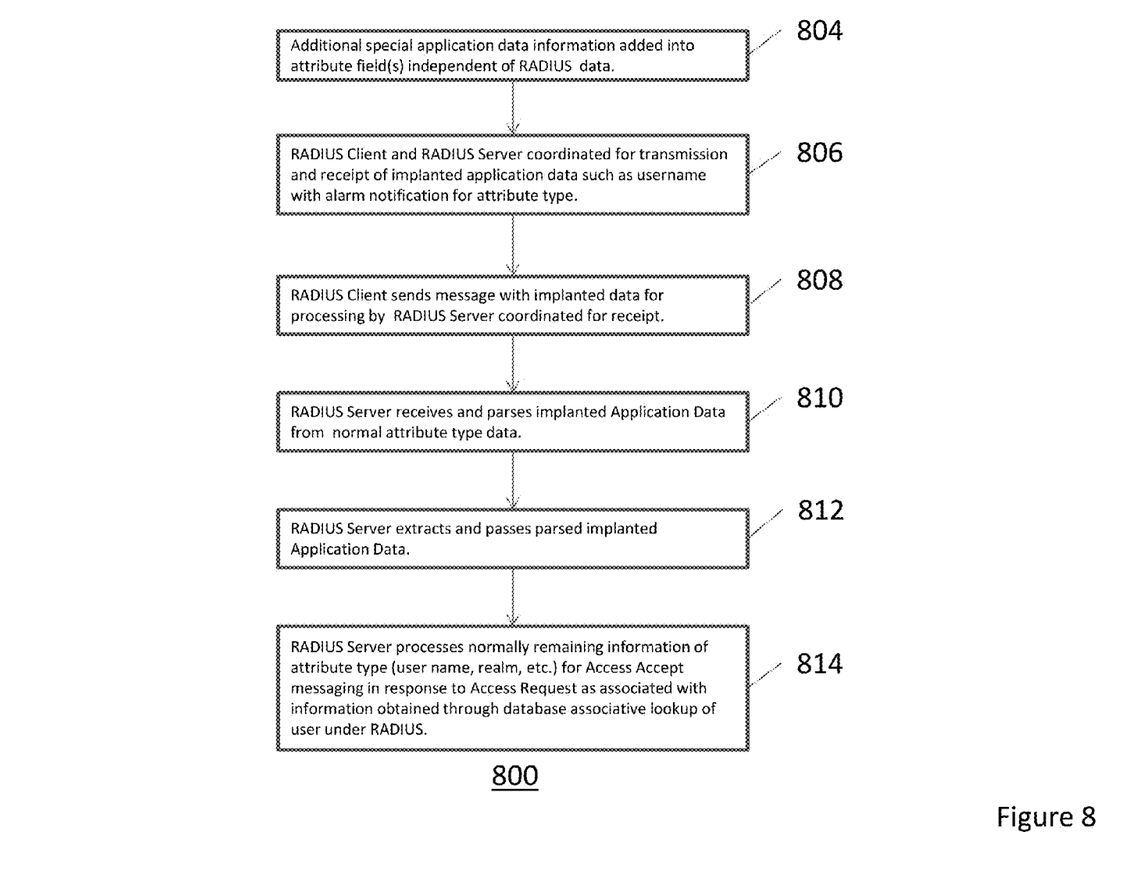
FIG. 8 illustrates a method of the present invention in which implanted application data is passed for extraction and passing by a RADIUS server and continued processing under the RADIUS protocol in accordance with one or more preferred embodiments.

FIG. 8 illustrates a method of the present invention in which implanted application data is passed for extraction and passing by a RADIUS server and continued processing under the RADIUS protocol in accordance with one or more preferred embodiments. From FIG. 8, the non-specific application data is added to a field of an attribute type in addition to the normal information associated with that attribute type and expected data to be received at 804. The RADIUS Client and RADIUS Server are pre-coordinated for communication, in which the client and server is expect to process non-specific data (i.e., special data) in accordance with a predetermined attribute type at 806. By way of example, the attribute type being a username, for example, containing a user name and alarm information, the alarm information is non-specific to the attribute type and is implanted application data intended for use elsewhere once identified and extracted by the RADIUS server whereas the user name is data anticipated as expected within the context of the attribute type, username.

At 808 the non-specific application data is implanted in the attribute type and is received through messaging associated with the RADIUS protocol to a RADIUS Server. The received implanted non-specific application data is parsed and extracted at 810. The extracted data is then sent to the intended recipient at 812. The RADIUS Server continues processing the expected specific data of the attribute type in accordance with the protocol processing at 814.

Figure 9:
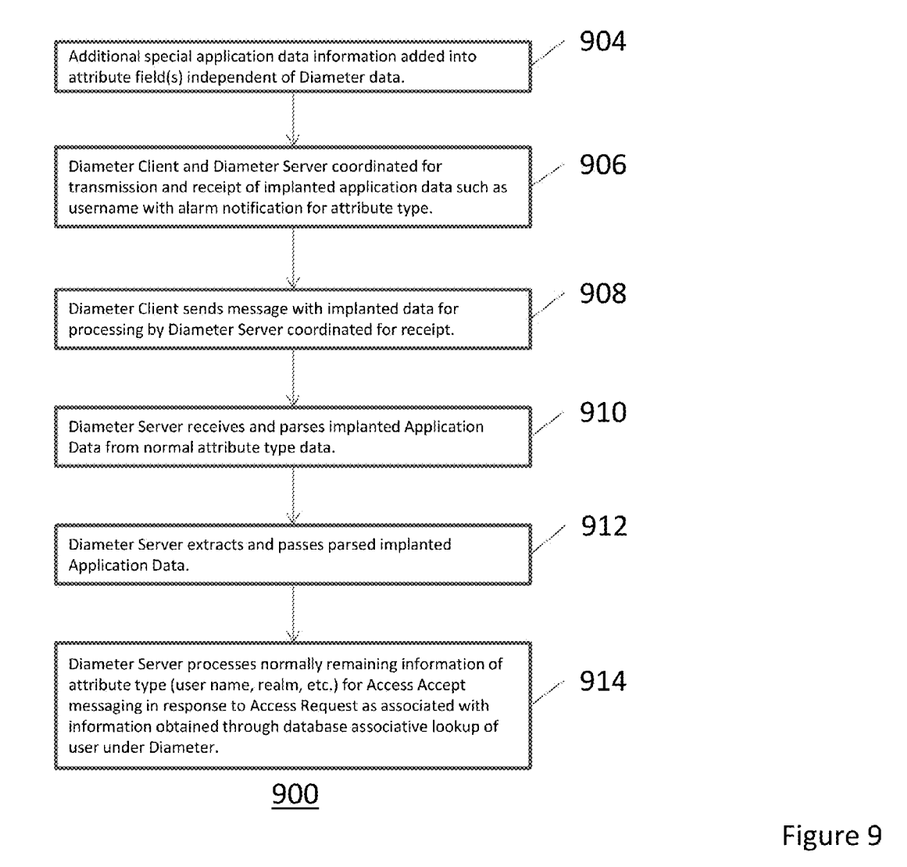
FIG. 9 illustrates a method of the present invention in which implanted application data is passed for extraction and passing by a Diameter server and continued processing under the Diameter protocol in accordance with one or more preferred embodiments.

FIG. 9 illustrates a method of the present invention in which implanted application data is passed for extraction and passing by a Diameter server and continued processing under the Diameter protocol in accordance with one or more preferred embodiments. From FIG. 9, the non-specific application data is added to a field of an attribute type in addition to the normal information associated with that attribute type and expected data to be received at 904. The Diameter Client and Diameter Server are pre-coordinated for communication, in which the client and server is expect to process non-specific data (i.e., special data) in accordance with a predetermined attribute type at 906. By way of example, the attribute type being a username, for example, containing a user name and alarm information, the alarm information is non-specific to the attribute type and is implanted application data intended for use elsewhere once identified and extracted by the Diameter Server whereas the user name is data anticipated as expected within the context of the attribute type, username.

At 908 the non-specific application data is implanted in the attribute type and is received through messaging associated with the Diameter protocol to a Diameter Server. The received implanted non-specific application data is parsed and extracted at 910. The extracted data is then sent to the intended recipient at 912. The Diameter Server continues processing the expected specific data of the attribute type in accordance with the protocol processing at 914.

Although the present invention has been described in accordance with the embodiments shown, one of ordinary skill in the art will readily recognize that there could be variations to the embodiments such as the use of protocol types which are not AAA-restrictive but are both format and operationally defined to operate in a manner similar to that of an AAA framework. For example but not by way of limitation, as it is widely understood that the authentication, authorization and accounting information is typically exchanged as between AAA clients and AAA servers through messages transported over wired or wireless networks, the use and/or application of those protocols which are or perform as a subset of the AAA framework, for instance, are included herein. Further, it is contemplated by the present invention that RADIUS and Diameter are but two specific protocols identified herein and that other systems, such as a Home Subscriber Server (HSS), that perform as a subset of the AAA framework, are also included hereinunder.

Similarly, those of ordinary skill in the art will appreciate that the present invention is inclusive of and may operate with attribute types of and within various protocols, general and customized, that may be adapted to concurrently use and receive non-specific application data in addition to the anticipated field data associated with an attribute type. Such variations, as is readily understood by those of ordinary skill in the art will would be within the spirit and scope of the present invention. Accordingly, many modifications may be made by one of ordinary skill in the art without departing from the spirit and scope of the present invention.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to one or more processors in one or more preferred embodiments for execution.

What is claimed is:

1. A method for delivering data within a predetermined protocol message across a communication network under a protocol, the method comprising the computer-implemented steps of:
   at a device in communication with a client capable of self-authentication, using an authentication request inclusive of both a normal attribute type field data and a non-specific application data, in a communications network with a server;
   implanting application data within a predetermined attribute type;
   authenticating the predetermined attribute type by the client in communication with the server by verifying the device through a lookup database by the server in association with the predetermined attribute type;
   passing implanted application data for extraction by the server, wherein the client and server are receptive to a use and inclusion of non-specific application data which is added to the predetermined attribute type;
   extracting the implanted application data from the predetermined attribute field at the server; and
   passing the extracted implanted application data to a second device from the server.

2. The method of claim 1, wherein the protocol comprises: an Authentication, Accounting, and Authorization (AAA) framework.

3. The method of claim 1, wherein the protocol is a Remote Authentication Dial-In User Service (RADIUS) protocol and the server is a RADIUS Server and the Client is a RADIUS client.

4. The method of claim 1, wherein the protocol is a Diameter protocol and the server is a Diameter Server and the client is a Diameter Client.

5. The method of claim 1, wherein the predetermined attribute type is one of username, and user-password.

6. The method of claim 5, wherein the step of implanting includes application data associated with non-specific information of an application activity.

7. The method of claim 6, where the application activity is one or more of an alarm, a notification, an activity start, an activity end, a point and an alert.

8. The method of claim 7, further including a data partition symbol for providing for demarcation of implanted application data in the predetermined attribute type, wherein the data partition is one of an alphanumeric symbol, a non-alphanumeric symbol, and a custom type character and separates a realm from information data in the attribute type.

9. The method of claim 8, wherein the step of verifying the device through a lookup database includes comparing information of the device with authenticated device information in the lookup database.

10. The method of claim 9, wherein the lookup database comprises thousands of device authentication associations.

11. The method of claim 10, wherein the step of extracting the implanted application data from the predetermined attribute field at the server includes identifying the implanted application data.

12. The method of claim 11, wherein the implanted application data is transmitted to a second server in communication with the device.

13. The method of claim 12, wherein the attribute type is a username and is of the format of a multi-digit device identifier as a user's name, implanted application data, the partition data symbol and trailing data following the partition data symbol.

14. The method of claim 13, wherein the client is authenticated with the server across the communication network, establishing a secure communications link as between the device and the server wherein the device is capable of accessing a network resource.

15. A computer program product stored on a non-transitory computer usable medium, comprising: computer readable program means for causing a computer to deliver data within a predetermined protocol message across a communication network under a protocol, comprising the steps of:
   at a device in communication with a client capable of self-authentication, using an authentication request inclusive of both a normal attribute type field data and a non-specific application data, in a communications network with a server;
   transmitting implanted application data within a predetermined attribute type along with information data of the predetermined attribute type in a message from the device to the client;
   passing implanted application data for extraction by the server, wherein the client and server are receptive to a use and inclusion of non-specific application data which is added to the predetermined attribute type;
   extracting the implanted data from the message for receipt by the server using logic at the server;
   authenticating the predetermined attribute type by the client in communication with the server by verifying the device through a lookup database by the server in association with the predetermined attribute type; and
   passing the extracted implanted application data to a second device from the server.

16. The product of claim 15, further comprising the step of including a data partition symbol as a demarcation point within the predetermined attribute type to separate the implanted data within the attribute type.

17. The product of claim 14, wherein the protocol comprises an Authentication, Accounting and Authorization (AAA) framework.

18. The product of claim 17, wherein the AAA framework is one of: i) a Remote Authentication Dial-In User Service (RADIUS) protocol and the AAA Server is a RADIUS Server and the AAA Client is a RADIUS Client; and ii) a Diameter protocol and the AAA Server is a Diameter Server and the AAA Client is a Diameter Client.

19. An apparatus operable to include
   implanted application data within a protocol message across a communication network under a protocol;
   one or more processors; and
   one or more stored sequences of instructions which, when executed by the one or more processors, are operable at least to:
      at a device in communication with a client capable of self-authentication, using an authentication request inclusive of both a normal attribute type field data and a non-specific application data, in a communications network with a server;
      implant application data within a predetermined attribute type;
      transmit the predetermined attribute type for receipt from the device to the client;
      authenticate the predetermined attribute type by the client in communication with the server by verifying the device through a lookup database by the server in association with the predetermined attribute type;
      pass implanted application data for extraction by the server, wherein the client and server are receptive to a use and inclusion of non-specific application data which is added to the predetermined attribute type; and, extract the implanted application data from the predetermined attribute field at the server at a predetermined period.

20. The apparatus of claim 19, wherein the protocol comprises: an Authentication, Accounting, and Authorization (AAA) framework.

21. The apparatus of claim 20, wherein the one or more stored sequences of instructions which, when executed by the one or more processors, are operable at least to further provide for extracting implanted application data at the server and the predetermined period is a period of time associated with receipt of the implanted application data being one of: i) upon and concurrent with receipt, after receipt but before verifying the device, after verifying the device but before providing a device access to resources across the communications network, and after providing the device access to the communications network under the AAA framework.

22. The apparatus of claim 20, wherein the AAA framework is one of: i) a Remote Authentication Dial-In User Service (RADIUS) protocol and the Server is a RADIUS Server and the Client is a RADIUS Client; and, ii) a Diameter protocol and the Server is a Diameter Server and the Client is a Diameter Client.

23. The apparatus of claim 20, wherein the attribute type is a username and is of the format of a multi-digit device identifier as a user's name, implanted application data, a partition data symbol and trailing data following the partition data symbol, wherein the symbol is for providing for demarcation of data in the predetermined attribute type.

* * * * *